(12) United States Patent
Amron (10) Patent No.: US 7,861,891 B2
(45) Date of Patent: Jan. 4, 2011

(54) APPARATUS FOR DISCHARGING A STREAM OF FLUID

(75) Inventor: Alan Amron, Brooklyn, NY (US)

(73) Assignee: Tropical Ventures, LLC, Hempstead, NY (US)

( * ) Notice: Subject to any disclaimer, the term of this patent is extended or adjusted under 35 U.S.C. 154(b) by 680 days.

(21) Appl. No.: 11/807,102

(22) Filed: May 25, 2007

(65) Prior Publication Data

US 2008/0290115 A1   Nov. 27, 2008

(51) Int. Cl.
B67D 7/12   (2010.01)
(52) U.S. Cl. .......................... 222/79; 446/267; 446/473
(58) Field of Classification Search ............. 222/74–75, 222/79; 446/267, 473
See application file for complete search history.

(56) References Cited

U.S. PATENT DOCUMENTS

| | | | | |
|---|---|---|---|---|
| 1,180,856 A | * | 4/1916 | LeFever | 222/79 |
| 1,180,858 A | * | 4/1916 | LeFever | 222/79 |
| 1,186,212 A | * | 6/1916 | LeFever | 222/79 |
| 2,892,289 A | * | 6/1959 | Ryan | 446/406 |
| 4,022,350 A | | 5/1977 | Amron | |
| 4,706,848 A | | 11/1987 | D'Andrade | |
| 4,757,946 A | | 7/1988 | Johnson | |
| 5,184,756 A | * | 2/1993 | Amron | 222/79 |
| 5,419,458 A | | 5/1995 | Mayer | |
| 5,538,457 A | | 7/1996 | Deal | |
| 5,878,914 A | * | 3/1999 | Johnson | 222/79 |
| 6,003,503 A | | 12/1999 | Johnson et al. | |
| 6,364,162 B1 | | 4/2002 | Johnson et al. | |
| 6,439,216 B1 | | 8/2002 | Johnson et al. | |
| 6,698,414 B1 | | 3/2004 | Menow et al. | |
| 2002/0074343 A1 | | 6/2002 | Johnson et al. | |
| 2004/0040551 A1 | | 3/2004 | Menow et al. | |

* cited by examiner

*Primary Examiner*—Kevin P Shaver
*Assistant Examiner*—Andrew Bainbridge
(74) *Attorney, Agent, or Firm*—Cohen Pontani Lieberman & Pavane LLP (57) ABSTRACT

A device for discharging a stream of fluid is presented. The device includes a water pump handle and trigger mechanism that are selectively connectable to a ratchet mechanism to allow incremental discharge of the fluid. The device includes a body accommodating a water reservoir and a fluid line extending through the body. A spring urges the ratchet bar to allow the discharge of fluid during the spring-induced movement of said ratchet bar. A trigger mechanism arrests the spring-induced movement of the ratchet bar.

21 Claims, 6 Drawing Sheets

APPARATUS FOR DISCHARGING A STREAM OF FLUID

BACKGROUND OF THE INVENTION

1. Field of the Invention

The invention relates generally to a device for discharging a stream of fluid, and more particularly to a device that includes a water pump handle and trigger mechanism that are selectively connectable to a ratchet mechanism to allow incremental discharge of the fluid.

2. Description of the Related Art

Various devices for discharging a stream of fluid, such as a pneumatic water gun, for example, are known. Most pneumatic water guns use air pressure to force water out of a nozzle and into the air. These types of water guns utilize one of two types of propulsion systems: a pressurized reservoir system, or a separate firing chamber system.

Water guns that use the pressurized reservoir system have a single reservoir for air and water. The reservoir is first partially filled with water, then air is forced in under pressure. When a trigger is pulled, the pressurized air forces water out of the reservoir Water guns that use the separate firing chamber system have a large reservoir for water only, and one or more smaller firing chambers. In this system, water is pumped from the reservoir into the firing chamber(s), compressing the air in the chamber(s). This exerts a force on the water, thus providing the power to push the water through the nozzle when the trigger is pulled.

SUMMARY OF THE INVENTION

In one aspect, the invention involves an apparatus for discharging a stream of fluid. The apparatus includes a body accommodating a water reservoir, a fluid line extending through the body having a first end connected to the reservoir and a second end comprising an outlet, and a ratchet bar assembly that includes a ratchet bar that includes teeth and a pawl interacting with the teeth. The ratchet bar is movable between a first position and a second position. The apparatus further includes a spring urging the ratchet bar toward the second position. The ratchet bar assembly is configured to allow a discharge of fluid from the fluid reservoir through the outlet during spring induced movement of the ratchet bar. The apparatus further includes a manually actuatable trigger mechanism that is movable from a rest position to a pulled position. The trigger mechanism is configured to arrest the spring induced movement of the ratchet bar in the rest position and allow the spring induced movement of the ratchet bar in the pulled position.

In one embodiment, the ratchet bar is manually movable to the first position against the urgency of the spring. In another embodiment, the apparatus includes a pump mechanism connected to the ratchet bar and is configured to pump air into the fluid reservoir to increase pressure in the fluid reservoir during movement of the ratchet bar. The pump mechanism pumps air into the reservoir during the spring induced movement. In still another embodiment, the apparatus includes a handle connected to the ratchet bar. The handle is movable between an operating position and a pump position, wherein the discharge of fluid is prevented when the handle is in the pump position. In yet another embodiment, the apparatus includes a hose clamp that contacts the fluid line and the ratchet bar. The hose clamp selectively clamps or unclamps the fluid line in response to movement of the ratchet bar thereby preventing or allowing the fluid to flow from the water reservoir through the fluid line to the outlet. The hose clamp is coupled to a spring. The spring holds the hose clamp in a clamping position thereby preventing the fluid from flowing from the water reservoir through the fluid line to the outlet. In other embodiments, the pump mechanism further includes an air hose coupled to the reservoir tank via a one-way valve. In still another embodiment, the trigger mechanism is battery powered. In yet another embodiment, the pump mechanism further includes a plurality of gears that make contact with the ratchet bar, a rotatable wheel coupled to the plurality of gears, and a shaft that includes a first end and a second end. The first end of the shaft is coupled to an outer portion of the rotatable wheel. The second end of the shaft is coupled to a piston. In response to movement of the ratchet bar, the plurality of gears rotate the rotatable wheel, which moves the shaft to cause the piston to pump air into the reservoir tank.

In another aspect, the invention involves an apparatus for discharging a stream of fluid. The apparatus includes a body portion that includes a handle portion and a barrel portion. The barrel portion includes a fluid output port. The apparatus further includes a fluid reservoir tank for holding the fluid. The fluid reservoir is coupled to the body portion. The apparatus further includes a fluid hose that includes a first end and a second end. The first end is in fluid communication with the reservoir tank. The second end is in fluid communication with the output port. The fluid hose extends through the body portion. The apparatus further includes a pump mechanism that includes a ratchet bar and spring means. The apparatus further includes a pump handle coupled to the pump mechanism facilitating manual operation of the pump, a fluid hose clamp that contacts the hose and the ratchet bar. The fluid hose clamp selectively clamps or unclamps the fluid hose in response to movement of the ratchet bar thereby preventing or allowing the fluid to flow from the tank through the fluid hose to the output port. The apparatus further includes a trigger mechanism that includes a pawl for selectively allowing or preventing movement of the ratchet bar. When the handle is moved to a first position, the pump mechanism forces air into the reservoir tank and the spring is compressed, and when the trigger mechanism is operated the ratchet bar moves to a second position by means of a force from the spring means.

In one embodiment, the trigger mechanism is battery powered. In another embodiment, the pump mechanism forces air into the reservoir tank when the ratchet bar moves to the second position. In still another embodiment, the pump mechanism further includes an air hose coupled to the reservoir tank via a one-way valve. In yet another embodiment, the hose clamp is coupled to a spring. The spring holds the hose clamp in a clamping position thereby preventing the fluid from flowing from the tank through the fluid hose to the output port. In other embodiments, the trigger mechanism further includes a spring. The spring holds the pawl in contact with the ratchet bar thereby preventing movement of the ratchet bar. In another embodiment, the fluid reservoir tank further includes a fluid input port. In some embodiments, when the handle is moved to a third position, the ratchet bar is disengaged from the hose clamp and the pawl. In another embodiment, the pump mechanism further includes a plurality of gears that contact the ratchet bar, a rotatable wheel coupled to the plurality of gears, and a shaft that includes a first end and a second end. The first end of the shaft is coupled to an outer portion of the rotatable wheel. The second end of the shaft is coupled to a piston. In response to movement of the ratchet bar, the plurality of gears rotate the rotatable wheel, which moves the shaft to cause the piston to pump air into the reservoir tank. In other embodiments, the pump mechanism further includes a first piston and a second piston.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, like reference characters denote similar elements throughout the several views.

DETAILED DESCRIPTION OF THE PRESENTLY PREFERRED EMBODIMENTS

The invention relates to a device for discharging a fluid, such as a pneumatic water gun, for example, that includes a water pump handle and trigger mechanism that are selectively connectable to a ratchet mechanism to allow incremental discharge of the fluid.

Figure 1:
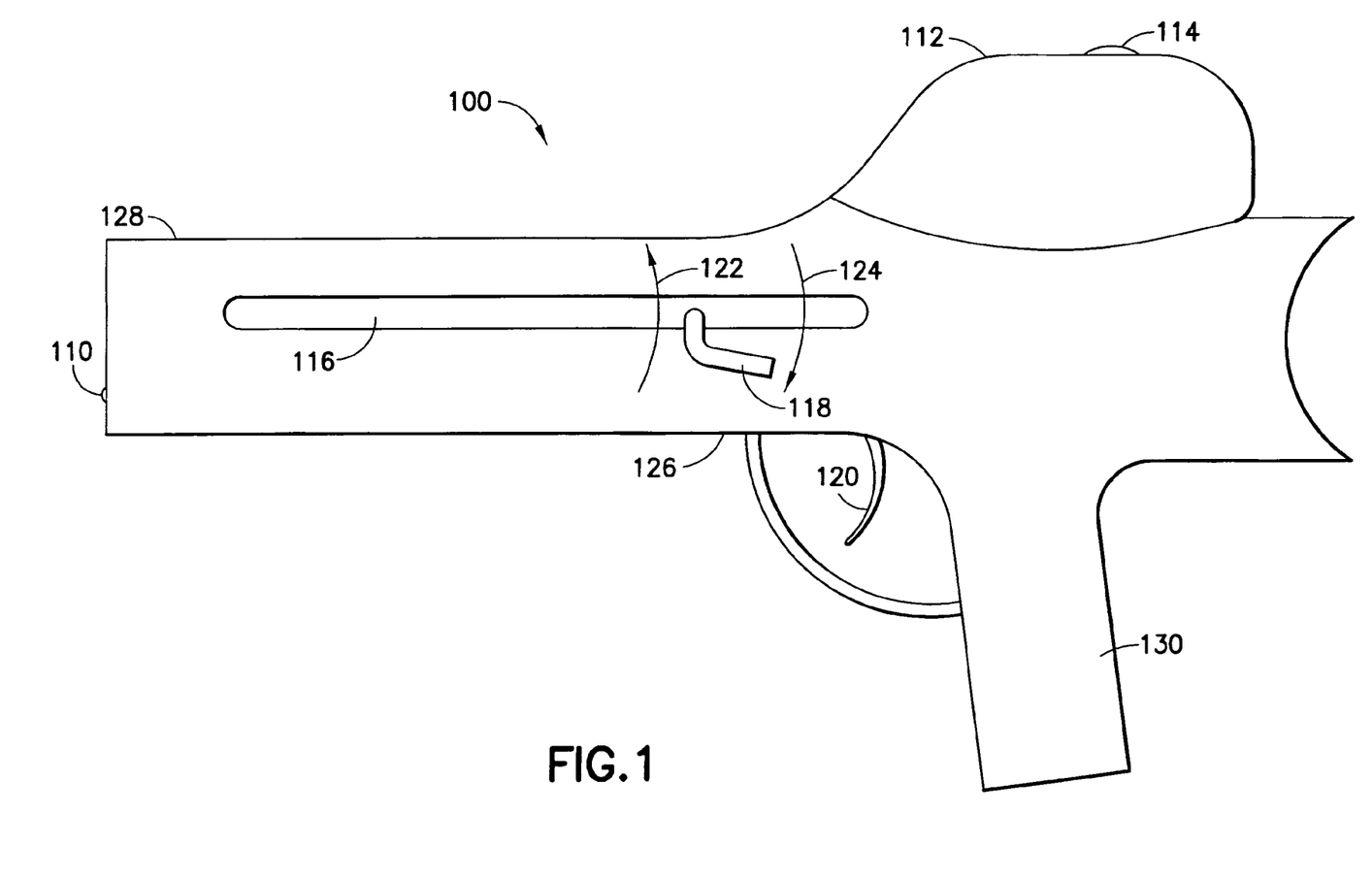
FIG. 1 is an illustrative schematic diagram of a water gun including a ratcheted pump mechanism and a trigger mechanism, according to one embodiment of the invention.

Referring to FIG. 1, in one embodiment, an illustrative schematic diagram of a pneumatic water gun 100 employing a ratcheted pump handle 118 and trigger mechanism is shown. The water gun 100 includes a body portion 126, a handle portion 130, a barrel portion 128, and a fluid reservoir 112 for storing a fluid, such as water, for example. The fluid reservoir 112 includes a fluid input port 114, and the barrel portion 128 includes a fluid output port 110. A slot 116 extends longitudinally along one side of the barrel portion 128, through which the pump handle 118 extends and couples to a pump mechanism 230 (see FIG. 2) disposed inside the body portion 126.

Figure 2:
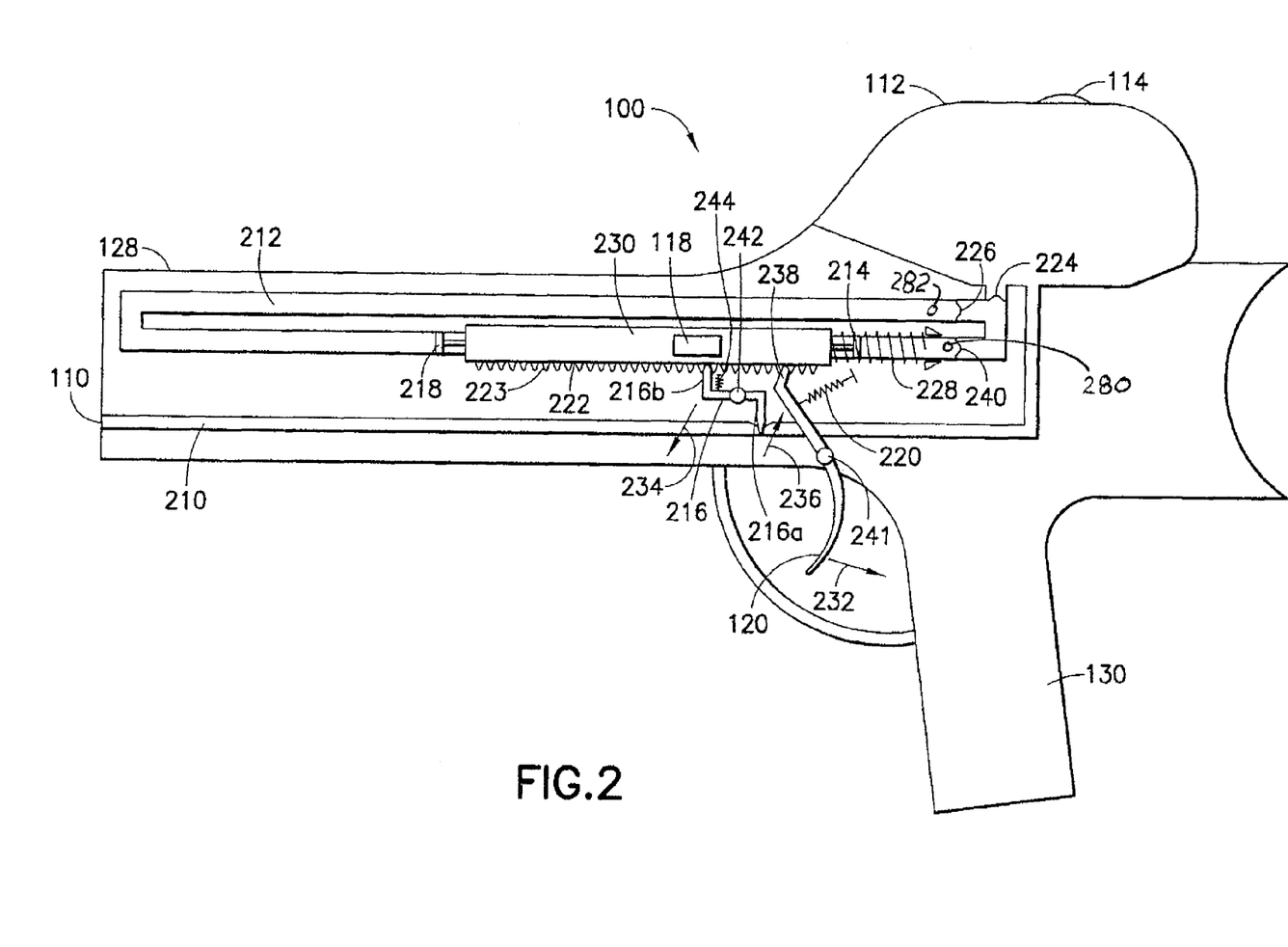
FIG. 2 in an illustrative schematic diagram of a ratcheted pump mechanism and a trigger mechanism disposed inside a body of a water gun, according to one embodiment of the invention.

Referring to FIG. 2, in one embodiment, an illustrative schematic diagram of the ratcheted pump mechanism 230 and a trigger mechanism disposed inside the body portion 126 of the pneumatic water gun 100 is shown. As previously mentioned, the pump handle 118 is coupled to the pump mechanism 230 that is disposed inside the body portion 126 and extends through the slot 116. The pump mechanism 230 includes pistons (or plungers) 214 and 218, a spring 228, and a ratchet bar 222, which includes a plurality of ratchet teeth 223. The pump mechanism 230 functions to pump air through an air hose 212 into the reservoir tank 112 to pressurize the fluid in the reservoir tank 112. The air hose 212 couples to the reservoir tank 112 via a one-way valve 224. One end of a fluid hose 210 couples to the fluid reservoir 112 and the other end of the fluid hose 210 couples to the output port 110.

The pump mechanism 230 is bidirectional. In operation, when the pump mechanism 230 is moved via the handle 118 towards the fluid output port 110, air is pumped through the air hose 212 through a one-way valve 226 and drawn in through one-way valve 280. When the handle 118 is move away form the fluid output port 110, air is pumped though a one-way valve 224 into the reservoir tank 112 and drawn in through one-way valve 282. During pumping, fluid is prevented from exiting the output port 110 though the fluid hose 210 by a hose clamp 216 that clamps the fluid hose 210 closed. When the pump mechanism 230 is moved via the handle 118 towards the reservoir tank 112, air is pumped through the air hose 212 through a one-way valve 240 and the one-way valve 224 into the reservoir tank 112. In other embodiments, any other known or hereafter developed methods of air pumping that are known can be used.

The hose clamp 216 pivots on pivot 242. A first end 216a of the clamp 216 functions to clamp the fluid hose 210 and prevents fluid from the reservoir 112 from flowing therethrough. A second end 216b of the clamp 216 contacts the ratchet bar 222. The clamp 216 is held in a clamping position via spring 244. When the ratchet bar 222 moves in a direction toward the output port 110, each of the ratchet teeth 223 successively push against and past the second end 216b of the clamp 216 (i.e., pushes the second end 216b in the direction indicated by arrow 234) and force the clamp 216 to pivot about the pivot 242. This causes the first end 216a of the clamp 216 to unclamp the fluid hose 210 (i.e., move in the direction indicated by arrow 236) and allow fluid in the reservoir tank 112 to flow from the reservoir tank 112 through the fluid hose 210 and out of the output port 110. Thus, the clamp 216 alternates between a clamping and unclamping position as the ratchet teeth 223 successively push past the second end 216b. The result is that the fluid exits the output port 110 in spurts.

The trigger mechanism includes a trigger 120, which includes a pawl portion 238. The trigger mechanism also includes pivot 241 and a spring 220. When the trigger 120 is not being pressed, the trigger 120 is held stationary by the spring 220 with pawl portion 238 preventing the ratchet bar 222 from moving towards the output port 110. When the trigger 120 is pressed by a user in the direction indicated by arrow 232, the trigger 120 pivots about pivot 240 and the pawl disengages from the ratchet bar 222. The ratchet bar 222 is then forced by spring 228 in the direction of the output port 110. The ratchet bar 222 will continue to move as long as the trigger 120 is pressed. Once a user stops pressing the trigger 120, the pawl portion 238 engages the ratchet bar 222 and the stops the ratchet bar 222 from moving.

As described in detail above, when the ratchet bar 222 moves, the clamp 216 alternates between an unclamped and clamped position. Thus, when the trigger 120 is pressed, the ratchet bar 222 moves and fluid is forced under air pressure through the output port 110 in spurts (i.e., provides a "machine-gun" effect). When the ratchet bar 222 has moved to the end of the barrel portion 128, the water gun 100 will no longer fire. In order to refire the water gun 100, the user must pull the handle back towards the reservoir tank end of the water gun 100. It should be noted that during firing, as the ratchet bar 222 moves toward the output port end of the water gun 100, the pumping mechanism simultaneously pumps air into the reservoir tank 112, thereby providing added air pressure during firing.

Figure 2B:
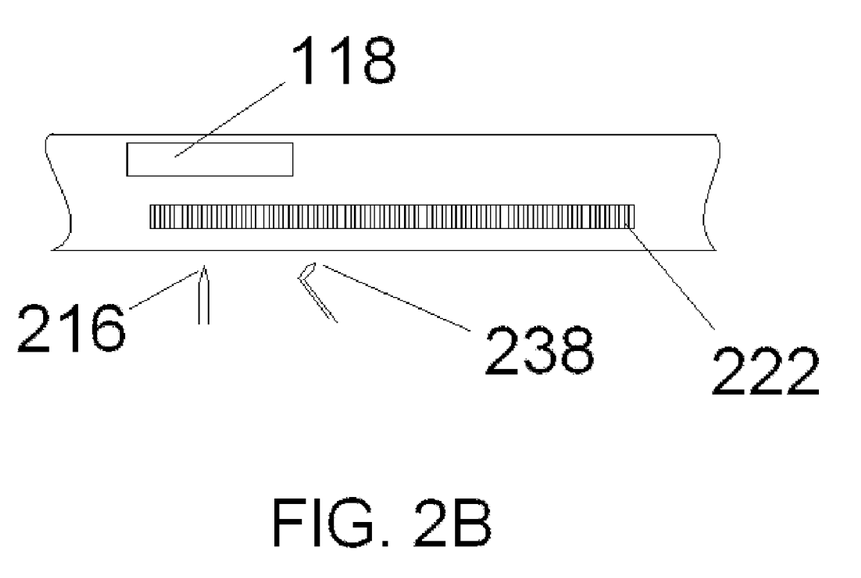
FIG. 2B is a partial view of the ratchet bar disengaged from the hose clamp and pawl.

To effect pumping of the water gun 100, the handle 118 is rotated in a direction indicated by arrow 122 (FIG. 1) to disengaged the ratchet bar 222 from the pawl portion 238 and the second end 216b of the clamp 216 (FIG. 2B). As previously described, the pump mechanism is bidirectional so pumping is accomplished by moving the handle 118 back and forth along the slot 116. After the desired air pressure is achieved, the handle 118 is rotated in a direction indicated by arrow 124 (FIG. 1) to engage the ratchet bar 222 with the pawl portion 238 and the second end 216b of the clamp 216, thus readying the water gun 100 for firing.

Figure 3:
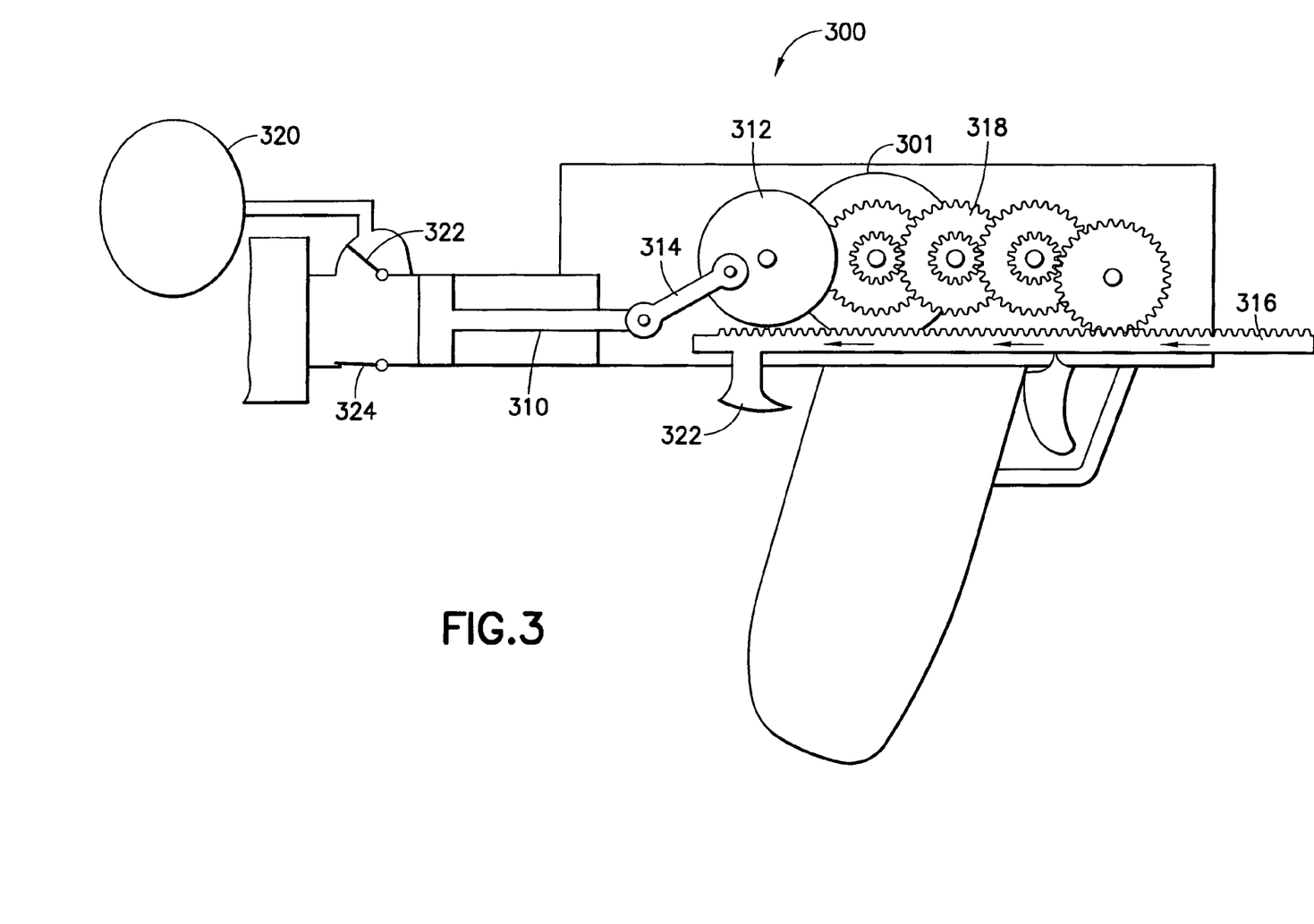
FIG. 3 is an illustrative schematic diagram of a water gun including a ratcheted pump handle and trigger mechanism, according to another embodiment of the invention.

Referring to FIG. 3, in another embodiment, an illustrative schematic diagram of a water gun 300 including a ratcheted pump handle 322 and trigger mechanism is shown. The water gun 300 includes a pumping mechanism 301. The pumping mechanism 301 includes a plurality of gears 318, a rotatable wheel 312, a shaft 314, a piston 310, and a ratchet bar 316. The ratchet bar 316 mechanically engages the gears 318. The gears 318 mechanically engage the rotatable wheel 312. A first end of the shaft 314 is coupled to an outer portion of the rotatable wheel 312 and a second edge of the shaft 314 is coupled to the piston 310. The piston 310 functions to pump air into a fluid reservoir 320.

In operation, when the handle 322 is pushed or pulled, the ratchet bar 316, which engages the plurality of gears 318, causes the gears 318 to rotate the rotatable wheel 312. The rotatable wheel 312 rotates, the shaft 314 moves to cause the piston 310 to move back and forth to pump air into a fluid reservoir 320. As the piston is pushed toward the fluid reservoir 320, a one-way valve 322 opens to allow air into the reservoir 320, and a one-way valve 324 closes to prevent air from being forced out of the water gun 300. When the piston 310 moves in the opposite direction, the one-way valve 322 closes to prevent air and fluid from being sucked out of the reservoir 320, and the one-way valve 324 opens to allow air to be sucked into the water gun 300.

Figure 4:
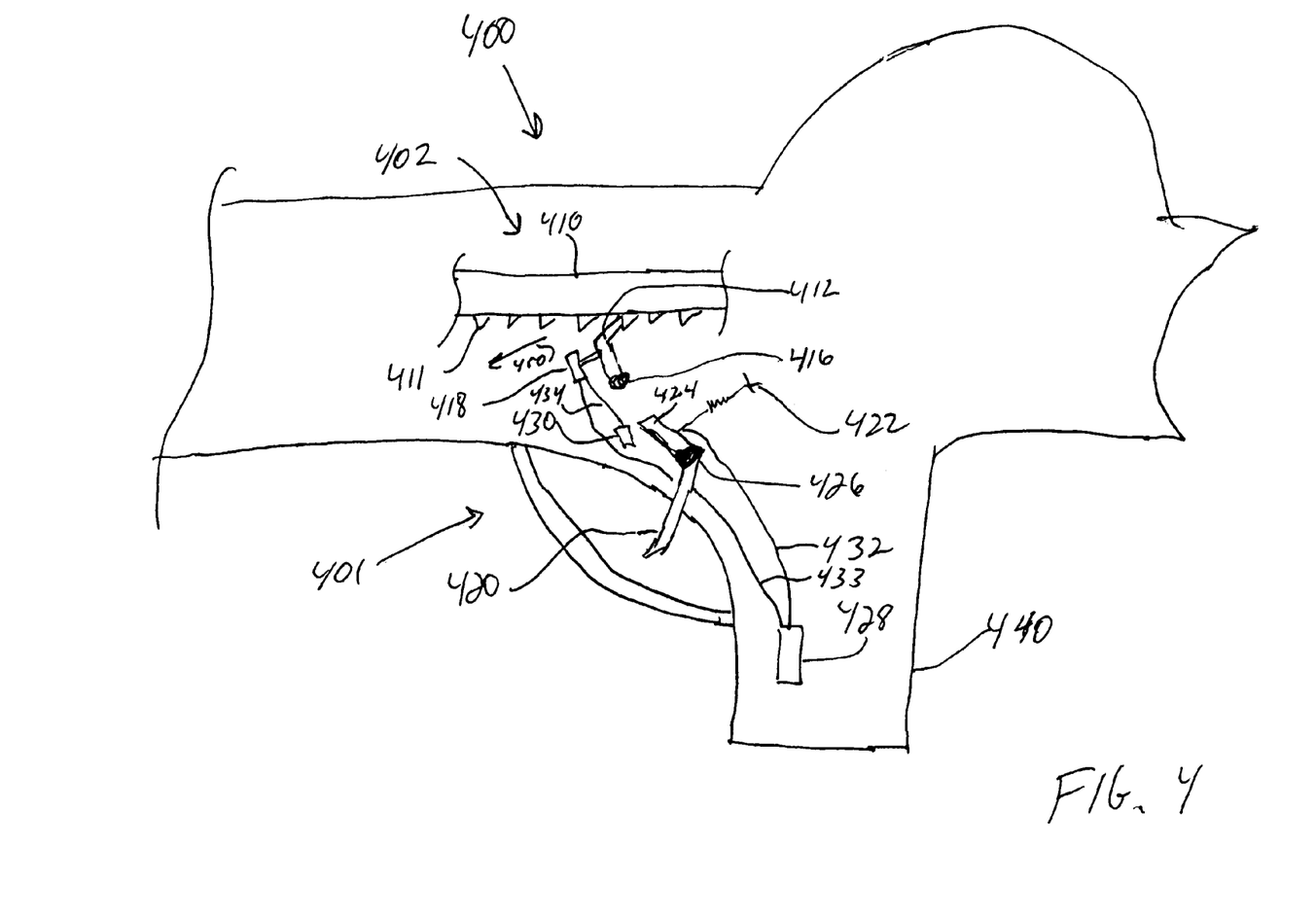
FIG. 4 is an illustrative partial schematic diagram of a water gun including a battery powered trigger mechanism, according to another embodiment of the invention.

Referring to FIG. 4, in another embodiment, an illustrative schematic diagram of a water gun 400 including a battery operated trigger mechanism 401 and ratchet mechanism 402 is shown.

The trigger mechanism 401 includes a trigger 420, which includes a contact portion 424. Trigger mechanism 401 also includes pivot 426, spring 422, electromechanical solenoid 418, contact member 430, wires 432, 433, 434, and battery 428. Wire 432 is in electrical communication with the contact member 430 and the battery 428. Wire 433 is in electrical communication with the solenoid 418 and the battery 428. Wire 434 is in electrical communication with the solenoid 418 and the contact member 430. The ratchet mechanism 402 includes a ratchet bar 410, a pawl 412, and pivot 416. The ratchet bar 410 includes a plurality of ratchet teeth 411. The battery 428 is stored in handle 440.

In operation, when a user pulls the trigger 420, the contact portion 424 contacts the contact member 430 thereby connecting the wires 434 and 432, which causes the battery 428 to supply power to solenoid 418. The solenoid 418, when powered by the battery 428, pulls the pawl 412 in the direction indicated by arrow 450, thereby disengaging the pawl 412 from the ratchet bar 410. This allows the ratchet bar 410 to move towards the output port 110. When the user releases the trigger 420, the spring 422 pulls the contact portion 424 away from the contact member 430, thereby disconnecting the battery 428 from solenoid 418, which results in the pawl 412 re-engaging the ratchet bar 410 and thus preventing the ratchet bar 410 from moving.

Figure 5:
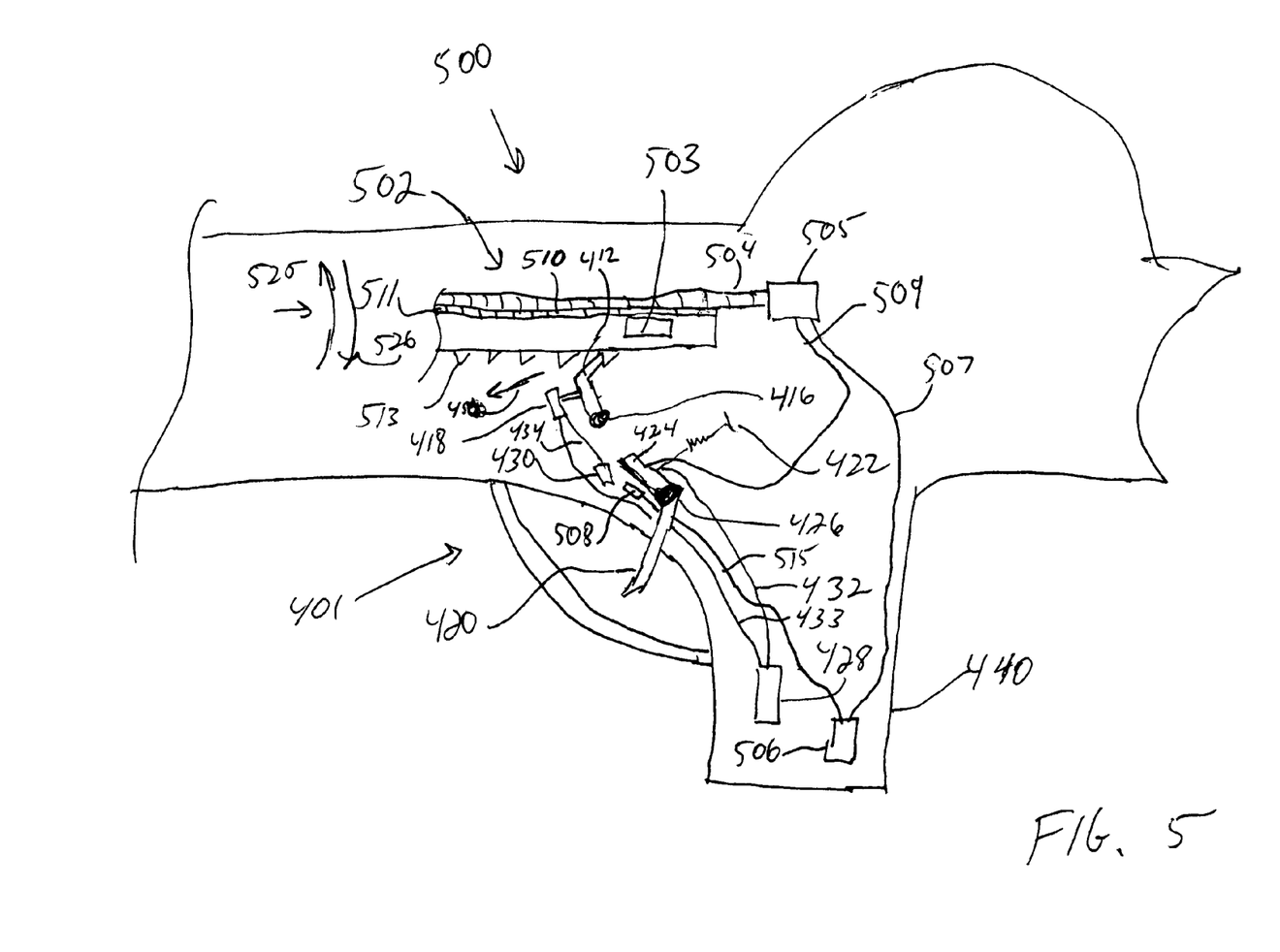
FIG. 5 is an illustrative partial schematic diagram of a water gun including a battery powered trigger mechanism and a motor driven ratchet mechanism, according to another embodiment of the invention.

Referring to FIG. 5, in still another embodiment, an illustrative partial schematic diagram of a water gun 500 including a battery operated trigger mechanism 401 and a motor driven ratchet mechanism 502 is shown.

In this embodiment, the trigger mechanism 401 operates as previously described. The ratchet mechanism 502 includes a motor 505, a threaded shaft 504, ratchet bar 510, wires 504, 507, 510, and contact member 508. The ratchet bar 510 includes ratchet teeth 513, threaded groove 511, and handle 503. Wire 507 is in electrical communication with the motor 505 and the battery 506. Wire 515 is in electrical communication with the contact 508 and the battery 506. Wire 509 is in electrical communication with the contact member 424 and the contact motor 505. The motor 505 drives the threaded shaft 504, which is received by threaded groove 511 in the ratchet bar 510.

In operation, when a user presses trigger 420, pawl 412 disengages from the ratchet 510 (as discussed in detail with respect to FIG. 4), and the contact portion 424 also establishes an electrical connection between wire 509 and wire 515 via contact 508. This results in an electrical connection between the motor 505 and the battery 506. When the motor 505 is powered, the motor 506 turns the threaded shaft 504. The threaded shaft 504, which is received by the threaded groove 511 rotates in the threaded groove 511 and forces the ratchet bar 510 to move toward the output port 110. When the user stops pressing the trigger 420, the contact portion 424 breaks the connection between wire 432 and contact 430, and the connection between wire 509 and contact 508. The motor 505 stops rotating the shaft 504 and thus stops moving the ratchet bar 510. Further, the pawl 412 re-engages the ratchet bar 510.

To effect pumping of the water gun 500, the handle 503 is rotated in a direction indicated by arrow 525 to disengage the ratchet bar 510 from the pawl 412 and the shaft 504. As previously described, the pump mechanism is bidirectional so pumping is accomplished by moving the handle 503 back and forth. After the desired air pressure is achieved, the handle 503 is rotated in a direction indicated by arrow 526 to engage the ratchet bar 510 with the pawl 412 and the shaft 504.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for discharging a stream of fluid, comprising:
   a body accommodating a water reservoir;
   a fluid line extending through said body having a first end connected to said reservoir and a second end comprising an outlet;
   a ratchet bar assembly comprising a ratchet bar including teeth and a pawl interacting with said teeth, said ratchet bar being movable between a first position and a second position;
   a spring urging said ratchet bar toward said second position, said ratchet bar assembly configured to allow a discharge of fluid from said fluid reservoir through said outlet during spring induced movement of said ratchet bar; and a manually actuatable trigger mechanism movable from a rest position to a pulled position, said trigger mechanism being configured to arrest the spring induced movement of said ratchet bar in the rest position and allow the spring induced movement of said ratchet bar in the pulled position, wherein the manually actuatable trigger mechanism is separate from the pawl.

2. The apparatus of claim 1, wherein said ratchet bar is manually movable to said first position against the urgency of said spring.

3. An apparatus for discharging a stream of fluid, comprising:

a body accommodating a water reservoir;

a fluid line extending through said body having a first end connected to said reservoir and a second end comprising an outlet;

a ratchet bar assembly comprising a ratchet bar including teeth and a pawl interacting with said teeth, said ratchet bar being movable between a first position and a second position;

a spring urging said ratchet bar toward said second position, said ratchet bar assembly configured to allow a discharge of fluid from said fluid reservoir through said outlet during spring induced movement of said ratchet bar;

a manually actuatable trigger mechanism movable from a rest position to a pulled position, said trigger mechanism being configured to arrest the spring induced movement of said ratchet bar in the rest position and allow the spring induced movement of said ratchet bar in the pulled position; and a pump mechanism connected to said ratchet bar configured to pump air into said fluid reservoir to increase pressure in said fluid reservoir during movement of said ratchet bar.

4. The apparatus of claim 3, further comprising a handle connected to said ratchet bar, said handle being movable between an operating position and a pump position, wherein the discharge of fluid is prevented when the handle is in the pump position.

5. The apparatus of claim 4, wherein said pump mechanism pumps air into said reservoir during the spring induced movement.

6. The apparatus of claim 1 further comprising a hose clamp contacting the fluid line and the ratchet bar, the hose clamp selectively clamping or unclamping the fluid line in response to movement of the ratchet bar thereby preventing or allowing the fluid to flow from the water reservoir through the fluid line to the outlet.

7. The apparatus of claim 6, wherein the hose clamp is coupled to a clamp spring, the clamp spring holding the hose clamp in a clamping position thereby preventing the fluid from flowing from the water reservoir through the fluid line to the outlet.

8. The apparatus of claim 3, wherein the pump mechanism further comprises an air hose coupled to the reservoir tank via a one-way valve.

9. The apparatus of claim 1, wherein the trigger mechanism is battery powered.

10. The apparatus of claim 1, wherein the pump mechanism further comprises a plurality of gears contacting the ratchet bar, a rotatable wheel coupled to the plurality of gears, and a shaft comprising a first end and a second end, the first end being coupled to an outer portion of the rotatable wheel, the second end being coupled to a piston, wherein, in response to movement of the ratchet bar, the plurality of gears rotate the rotatable wheel which moves the shaft to cause the piston to pump air into the reservoir tank.

11. An apparatus for discharging a stream of fluid, comprising:

a body portion comprising a handle portion and a barrel portion, the barrel portion comprising a fluid output port;

a fluid reservoir tank for holding the fluid and being coupled to the body portion;

a fluid hose comprising a first end and a second end, the first end in fluid communication with the reservoir tank, the second end in fluid communication with the output port, the fluid hose extending through the body portion;

a pump mechanism comprising a ratchet bar and spring means;

a pump handle coupled to the pump mechanism facilitating manual operation of the pump;

a fluid hose clamp contacting the hose and the ratchet bar, the fluid hose clamp selectively clamping or unclamping the fluid hose in response to movement of the ratchet bar thereby preventing or allowing the fluid to flow from the tank through the fluid hose to the output port;

a trigger mechanism comprising a pawl for selectively allowing or preventing movement of the ratchet bar;

wherein when the handle is moved to a first position, the pump mechanism forces air into the reservoir tank and the spring means is compressed; and wherein when the trigger mechanism is operated the ratchet bar moves to a second position by means of a force from the spring means.

12. The apparatus of claim 11, wherein the trigger mechanism is battery powered.

13. The apparatus of claim 11, wherein the pump mechanism forces air into the reservoir tank when the ratchet bar moves to the second position.

14. The apparatus of claim 11, wherein the pump mechanism further comprises an air hose coupled to the reservoir tank via a one-way valve.

15. The apparatus of claim 11, wherein the hose clamp is coupled to a spring, the spring holding the hose clamp in a clamping position thereby preventing the fluid from flowing from the tank through the fluid hose to the output port.

16. The apparatus of claim 11, wherein the trigger mechanism further comprises a clamp spring, the clamp spring holding the pawl in contact with the ratchet bar thereby preventing movement of the ratchet bar.

17. The apparatus of claim 11, wherein the fluid reservoir tank further comprises a fluid input port.

18. The apparatus of claim 11, wherein when the handle is moved to a third position, the ratchet bar is disengaged from the hose clamp and the pawl.

19. The apparatus of claim 11, wherein the pump mechanism further comprises a plurality of gears contacting the ratchet bar, a rotatable wheel coupled to the plurality of gears, and a shaft comprising a first end and a second end, the first end being coupled to an outer portion of the rotatable wheel, the second end being coupled to a piston, wherein, in response to movement of the ratchet bar, the plurality of gears rotate the rotatable wheel which moves the shaft to cause the piston to pump air into the reservoir tank.

20. The apparatus of claim 11, wherein the pump mechanism further comprises a first piston and a second piston.

21. The apparatus of claim 1, wherein the pawl and the trigger mechanism are configured to separately interact with the ratchet assembly.

* * * * *